(12) United States Patent
Geijtenbeek et al.

(10) Patent No.: US 7,432,665 B2
(45) Date of Patent: Oct. 7, 2008

(54) METHOD AND DEVICE FOR DRIVING A METAL HALIDE LAMP

(75) Inventors: Johannes Jacobus Franciscus Geijtenbeek, Eindhoven (NL); Johan Leopold Victorina Hendrix, Eindhoven (NL); Fransiscus Arnoldus Vermeulen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 363 days.

(21) Appl. No.: 10/514,281

(22) PCT Filed: Apr. 22, 2003

(86) PCT No.: PCT/IB03/01547

§ 371 (c)(1),
(2), (4) Date: Nov. 12, 2004

(87) PCT Pub. No.: WO03/098659

PCT Pub. Date: Nov. 27, 2003

(65) Prior Publication Data

US 2006/0125415 A1    Jun. 15, 2006

(30) Foreign Application Priority Data

May 17, 2002 (EP) .................... 02076943

(51) Int. Cl.
*H05B 37/02* (2006.01)

(52) U.S. Cl. .............. 315/291; 315/209 R; 315/226
(58) Field of Classification Search ............. 315/224, 315/291, 308, 209 R, 225, 226, 307
See application file for complete search history.

(56) References Cited

U.S. PATENT DOCUMENTS

| | | | | |
|---|---|---|---|---|
| 5,563,777 A * | 10/1996 | Miki et al. | ............ | 363/37 |
| 5,798,620 A * | 8/1998 | Wacyk et al. | ............ | 315/307 |
| 5,907,196 A | 5/1999 | Hayami et al. | | |
| 6,133,695 A | 10/2000 | Caya et al. | | |
| 6,175,199 B1 * | 1/2001 | Moskowitz | ............ | 315/291 |
| 6,369,518 B1 | 4/2002 | Kelly et al. | | |
| 6,979,958 B2 * | 12/2005 | Zhu et al. | ............ | 315/246 |

FOREIGN PATENT DOCUMENTS

| | | |
|---|---|---|
| DE | 9017622 U1 | 3/1991 |
| EP | 1089601 A1 | 4/2001 |

\* cited by examiner

*Primary Examiner*—Trinh V Dinh
*Assistant Examiner*—Dieu Hien T Duong

(57) ABSTRACT

A method for driving a lamp is described includes generating a light controlling DC electric field E with a desired direction and a desired strength inside the lamp such as to obtain a desirable ion distribution inside the lamp. The lamp is supplied with a commutating current with a DC component, having a constant current intensity and a duty cycle differing from 50%. By setting the duty cycle, it is possible to set a certain average value of the lamp current, allowing the efficacy and/or color temperature of the lamp to be influenced.

11 Claims, 5 Drawing Sheets

METHOD AND DEVICE FOR DRIVING A METAL HALIDE LAMP

Figure 1:
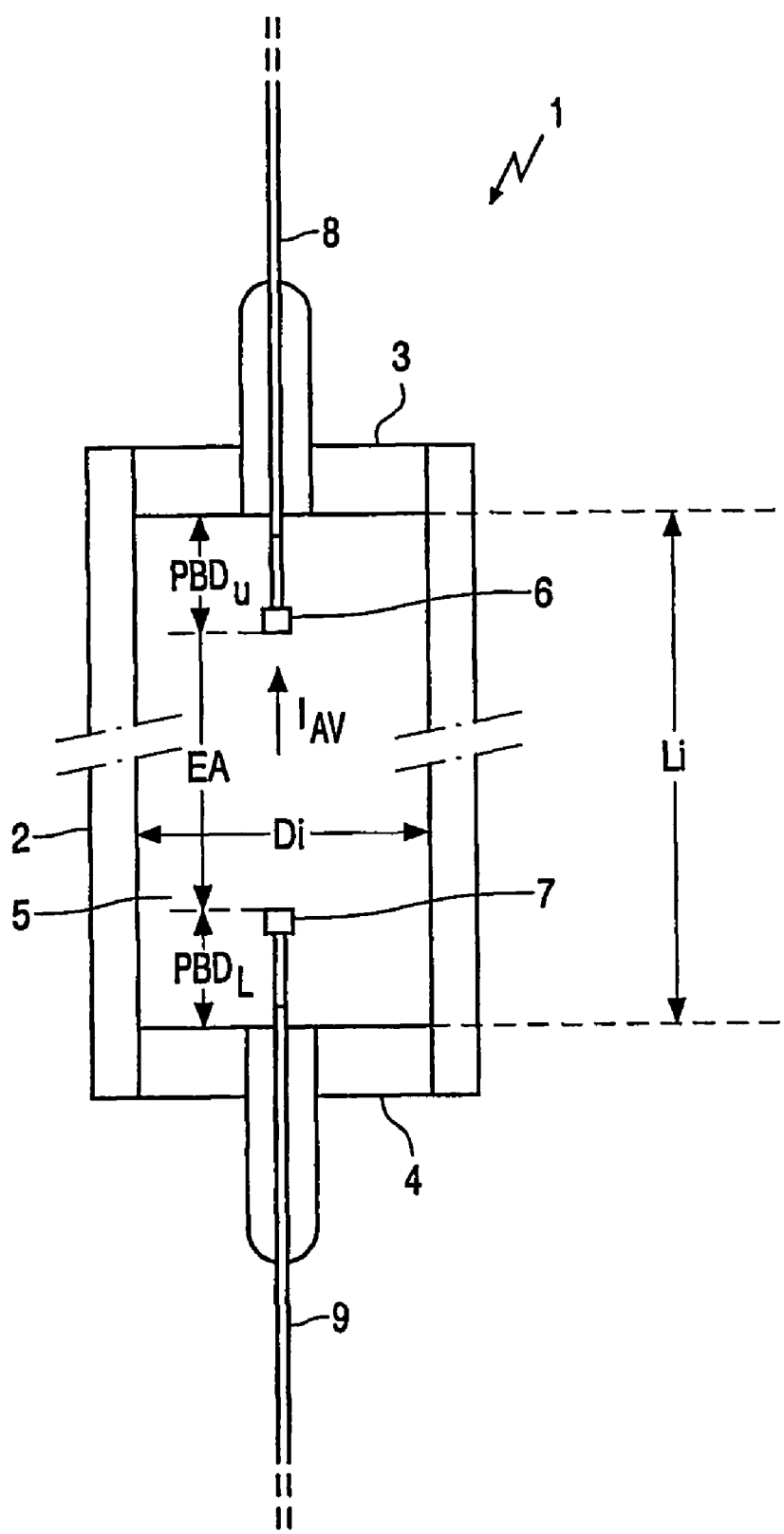

The present invention relates in general to a method and a device for driving a gas discharge lamp, specifically a HID lamp, more specifically a metal halide lamp.

Gas discharge lamps are commonly known. In general, they comprise a light transmitting vessel enclosing a discharge chamber in a gastight manner, an ionizable filling and a pair of electrodes located opposite each other in the discharge chamber, each electrode being connected to an associated current conductor which extends from the discharge chamber through the lamp vessel to the exterior. During operation, a voltage is applied across said electrodes, and a gas discharge occurs between said electrodes causing a lamp current to flow between the electrodes. Although it is possible to drive an individual lamp within a relatively wide range of operating currents, a lamp is typically designed for being operated at a specific lamp voltage and lamp current and thus to consume a specific nominal electric power. At this rated electric power, the lamp will generate a rated amount of light. Since HID lamps are commonly known to persons skilled in the art, it is not necessary to discuss their construction and operation here in more detail.

A high-pressure discharge lamp is typically driven by an electronic ballast supplying commutating DC current. An electronic ballast or driver for such a lamp typically comprises an input for receiving an AC mains voltage, a rectifier for rectifying the AC mains voltage to a rectified DC voltage, a DC/DC upconverter for converting the rectified mains DC voltage to a higher DC voltage, a downconverter for converting said higher DC voltage to a lower DC voltage (lamp voltage) and a higher DC current (lamp current), and a commutator for regularly changing the direction of this DC current. The downconverter behaves like a current source. Typically, the commutator operates at a frequency in the order of about 100 Hz. Therefore, in principle, the lamp is operated at constant current magnitude, the lamp current regularly changing its direction within a very brief time (commutating periods) in a symmetric way, i.e. an electrode is operated as a cathode during 50% of each current period and is operated as anode during the other 50% of each current period. This mode of operation will be indicated as square wave current operation.

Although many of the aspects of the present invention are also applicable to different lamp types, the present invention relates specifically to metal halide lamps with a relative large aspect ratio, i.e. the ratio of length/diameter is larger than 3 or even 4; conventionally, the aspect ratio is typically in the order of 2.

One problem of metal-halide lamps is that their behavior in a horizontal orientation differs from their behavior in a vertical orientation. In a horizontal orientation, the spatial distribution of the particles is almost homogeneous. In a vertical orientation, the spatial distribution of the particles is dependent on the location along the axis of the lamp. This phenomenon, indicated as segregation, is caused by physical effects like convection and diffusion, both determined by the atmospheric condition within the lamp. The amount of segregation depends on circumstances like pressure and type of material of the ionizable filling. The segregation effect increases with increasing electrode spacing, i.e. with increasing aspect ratio.

Since, in a metal-halide lamp, the light is produced by the atoms, segregation has the consequence that the light intensity and light color is not constant anymore along the central axis of the lamp.

It is a general objective of the present invention to be able to influence the light-generating capabilities of a metal-halide lamp in its vertical orientation.

More particularly, the present invention aims to influence the efficacy of a metal-halide lamp.

In accordance with one aspect, the present invention aims to counteract the effect of segregation, thereby ideally keeping the light intensity and light color along the central axis of the lamp as constant as possible. In accordance with a particular objective, the present invention aims to provide a lamp assembly which automatically maintains a constant efficacy, independent of the lamp orientation.

In accordance with another aspect, the present invention aims to influence the intensity and preferably also the color temperature of the light generated by a metal-halide lamp. In accordance with a particular objective, the present invention aims to provide a lamp assembly with variable color temperature, which is capable of varying the color temperature over a very large range.

The present invention is, inter alia, based on the recognition that the current through the lamp influences the particle distribution. Based on this insight, according to an important aspect of the present invention, a metal-halide lamp is operated with a commutating current with a DC component. Depending on the lamp type, varying this DC current component will vary the efficacy and/or the color temperature.

Figure 2:
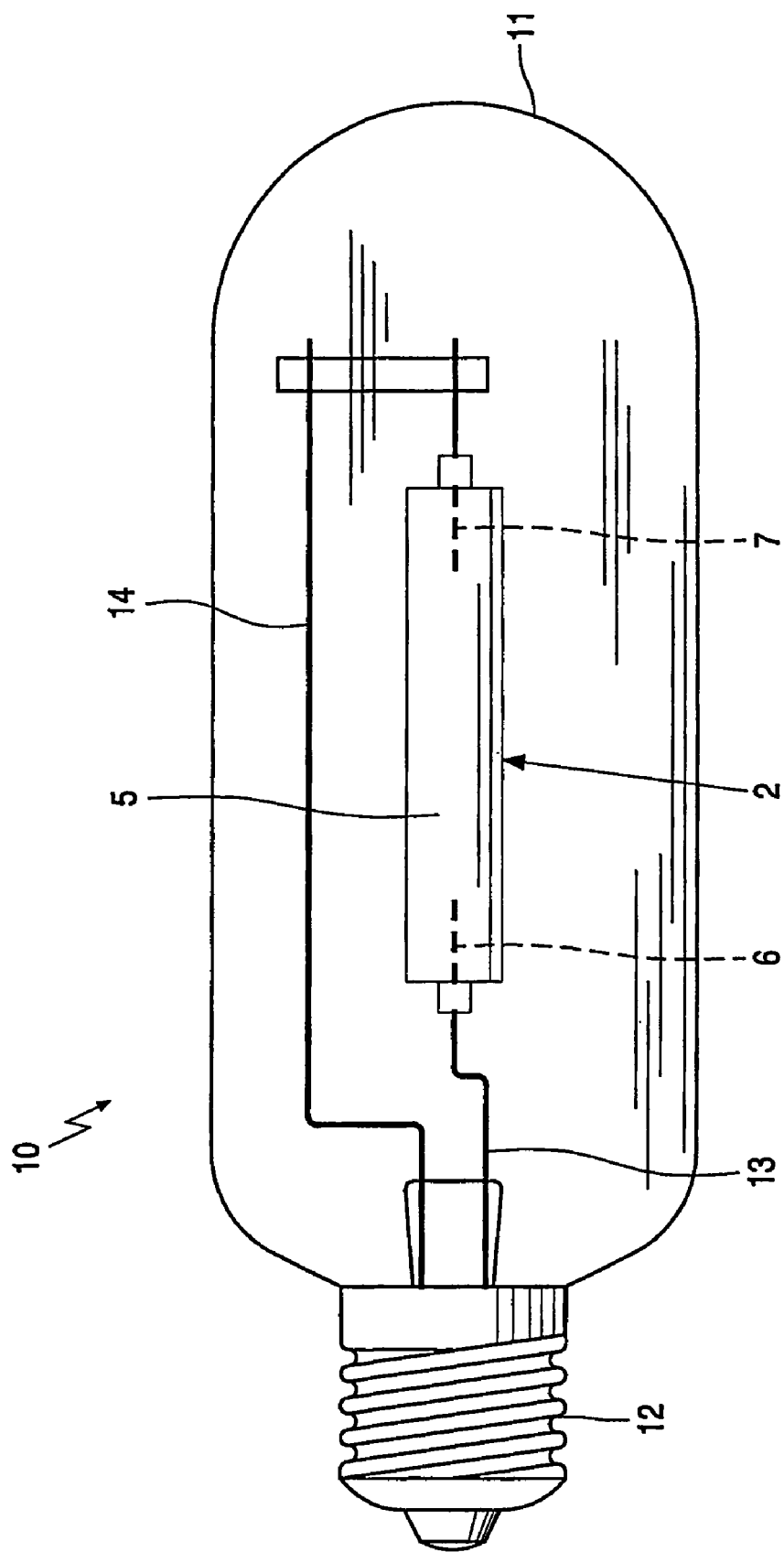
Figure 3:
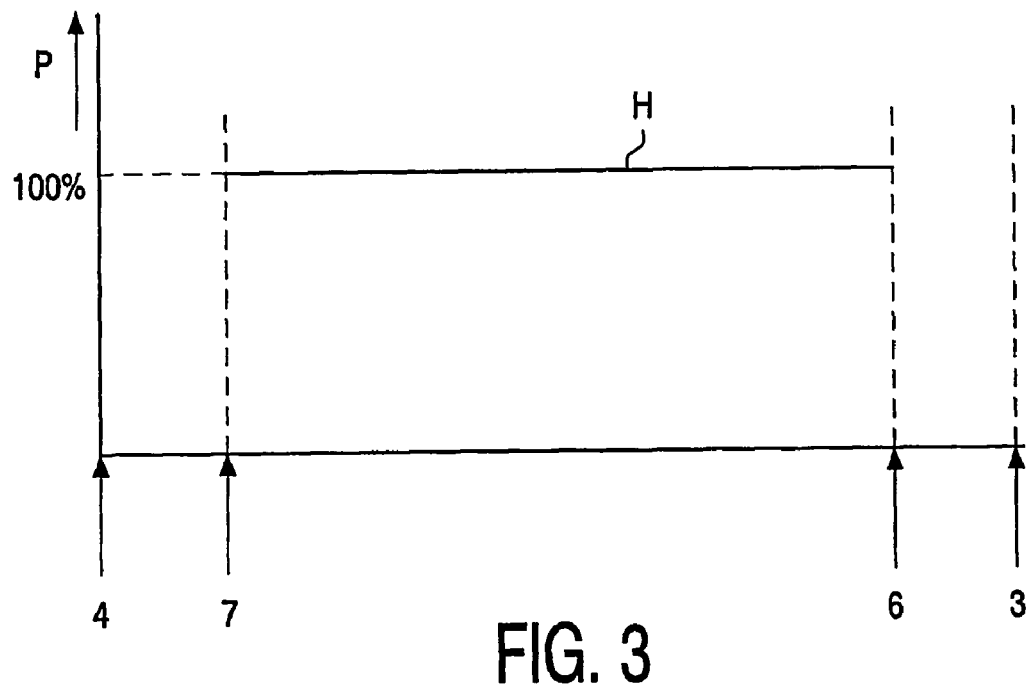
Figure 4:
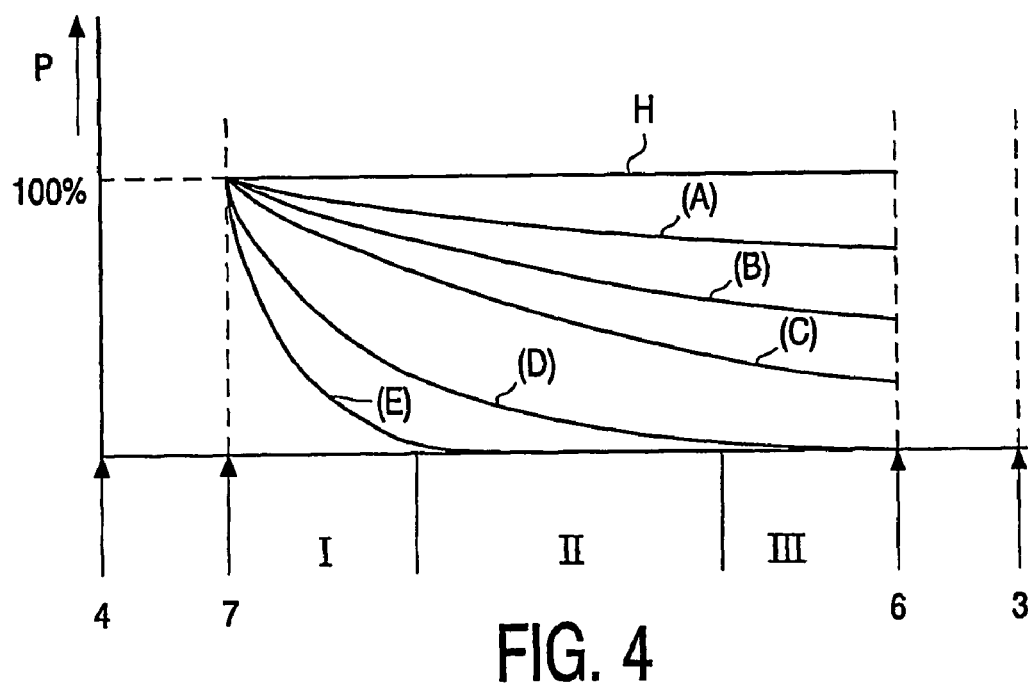
Figure 5:
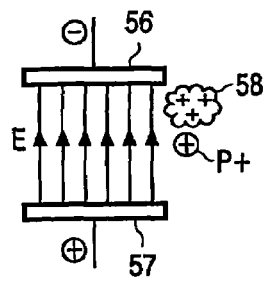
Figure 6A:
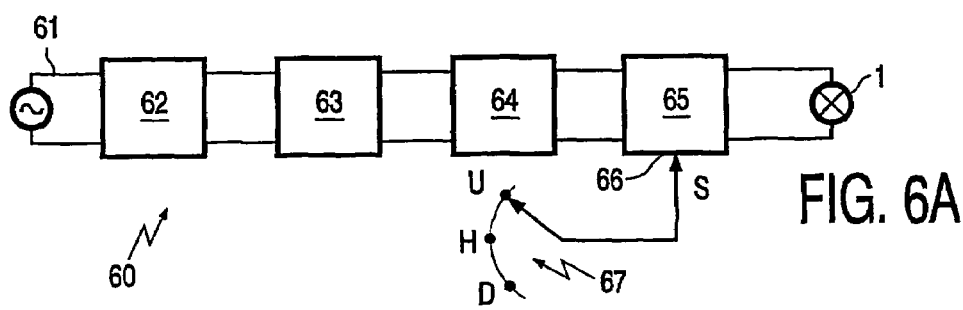
Figure 6B:
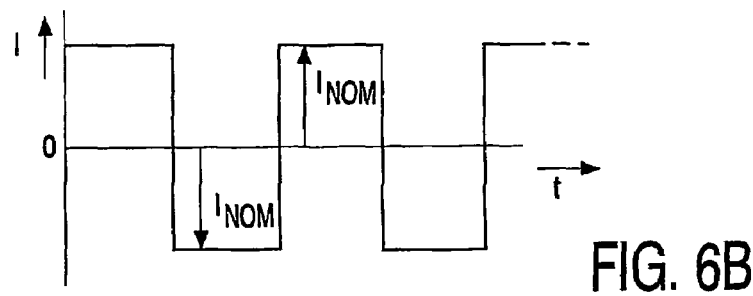
Figures 6C, 6D:
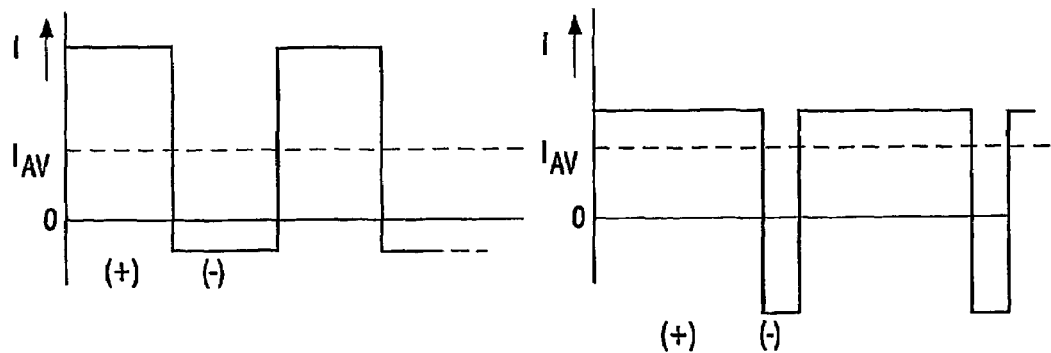
Figure 7:
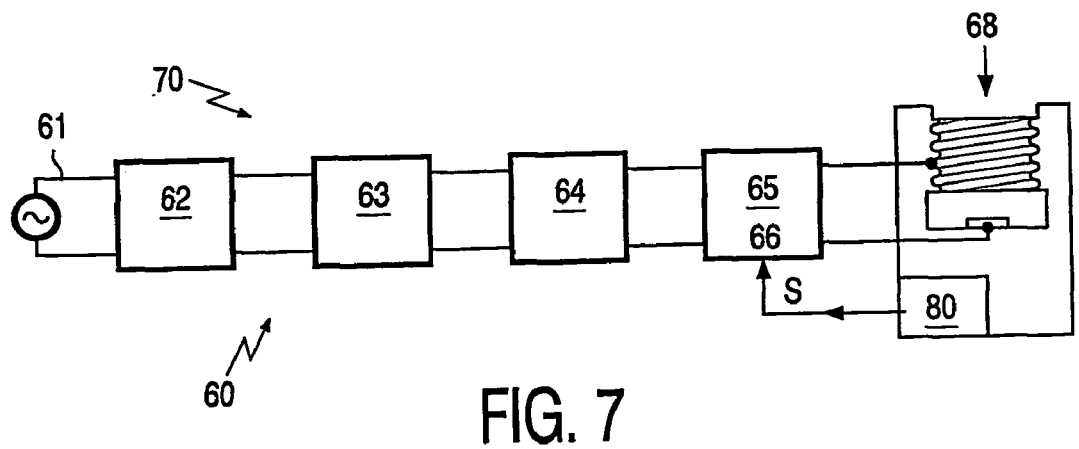
Figure 8:
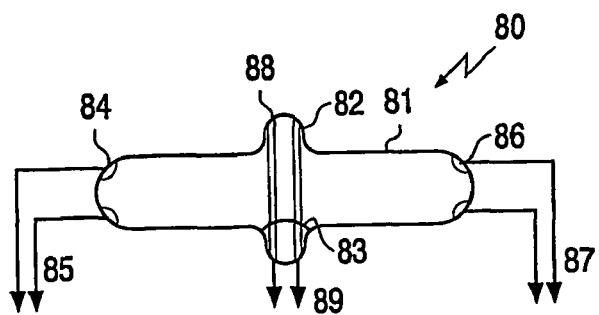
Figure 9:
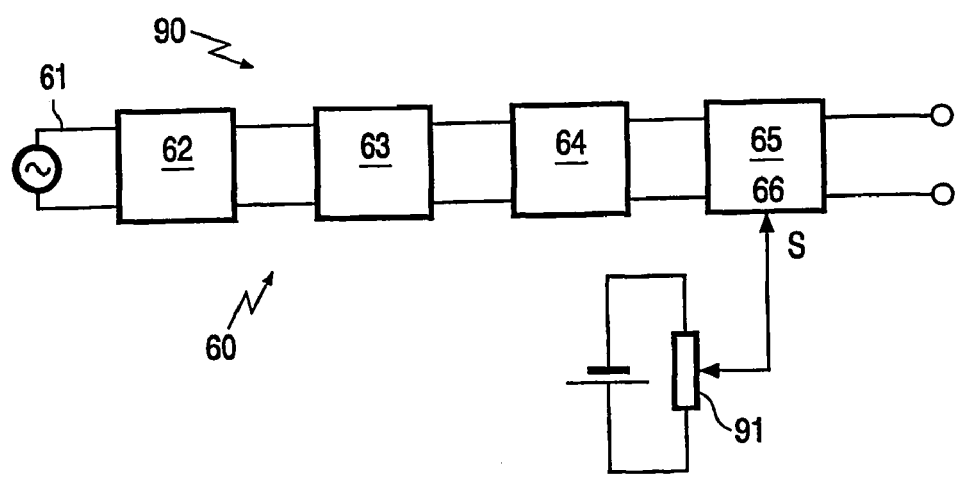

These and other aspects, features and advantages of the present invention will be further explained by the following description with reference to the drawings, in which:

FIG. 1 schematically shows an embodiment of a metal-halide lamp,

FIG. 2 schematically shows a lamp assembly,

FIG. 3 is a graph illustrating the particle distibution along the central axis of a lamp in its horizontal orientation, FIG. 4 is a graph illustrating the particle distibution along the central axis of a lamp in its vertical orientation, FIG. 5 schematically illustrates electrically induced ion drift, FIG. 6A is a block diagram schematically illustrating an electronic ballast, FIG. 6B is a graph showing lamp current as a function of time, illustrating square wave current operation, FIG. 6C is a graph showing lamp current as a function of time, illustrating a commutating current with a non-zero average and 50% duty cycle, FIG. 6D is a graph showing lamp current as a function of time, illustrating a commutating current with a non-zero average and constant current intensity, FIG. 7 is a block diagram schematically illustrating an embodiment of an electronic ballast in accordance with the present invention, FIG. 8 schematically illustrates an embodiment of an orientation detector, FIG. 9 is a block diagram schematically illustrating another embodiment of an electronic ballast in accordance with the present invention.

First, the general operation of a metal-halide lamp, and the consequences of lamp orientation, will be explained with reference to FIGS. 1-4.

FIG. 1 schematically shows a possible embodiment of a metal-halide lamp, generally indicated at reference numeral 1. The lamp 1 comprises a light transmissive vessel 2 having, in the embodiment shown, a circular cylindrical shape and having an internal diameter $D_i$; however, other shapes are possible too. Although not essential in the context of the present invention, the vessel 2 is preferably made from ceramic material; alternatively, the vessel 2 could be made from quartz. At its longitudinal ends, the vessel 2 is closed in a gastight manner by plugs or end caps 3, 4 of a compatible material. The vessel 2 and the plugs and/or end caps 3, 4 enclose a discharge chamber 5 having a diameter equal to the internal diameter Di of the vessel 2 and having an axial length Li determined by the distance between the end caps 3 and 4. An aspect ratio AR is defined as the ratio Li/Di.

Inside the discharge chamber 5, two electrodes 6, 7 are arranged at a mutual distance EA and substantially aligned with the central axis of the vessel 2. In a gastight manner, electrode conductors 8, 9 extend from the electrodes 6, 7 through the end caps 3, 4, respectively. If the end caps 3, 4 are made from quartz, the conductors 8, 9 may be molten into the quartz. Typically, the electrodes 6, 7 will be made from a material differing from the material of the electrode conductors 8, 9; for example, the electrodes 6, 7 may be made from tungsten.

Inside the discharge vessel 2, i.e. in the discharge chamber 5, an ionizable filling is arranged. The filling typically comprises an atmosphere comprising a substantial amount of mercury (Hg). Typically, the atmosphere also comprises elements like xenon (Xe) and/or argon (Ar). In a practical example, where the overall pressure inside the discharge vessel 2 is in the order of 1-2 atm, argon and xenon may be present in the ratio 1:1. In another practical example, where the overall pressure is in the order of 10-20 atm, the discharge chamber may contain mercury and a relatively small amount of argon. In the following, said examples of commercially available lamps will be indicated as relatively low-pressure lamp and relatively high pressure lamp, respectively.

The discharge vessel 2 also contains one or more metal-halide substances. Although these may comprise bromides or other halides, these substances typically comprise iodides. Typical examples of such possible substances are lithium iodide, cerium iodide, sodium iodide. Other substances are possible, too.

The metal halides are provided as a saturated system comprising an excess amount of salt, such that during operation of the lamp a salt pool of melted salt will be present inside the discharge chamber 5. In the following, it will be assumed that the salt pool is located at the lowest location inside the discharge chamber 5.

In operation, a discharge will extend between the electrodes 6, 7. Due to the high temperature of the discharge, said substances will be ionized and will produce light. The color of the light produced is different for different substances; for instance, the light produced by sodium iodide is red while the light produced by cerium iodide is green. Typically, the lamp will contain a mixture of suitable substances, and the composition of this mixture, i.e. the identity of said substances as well as their mutual ratio, will be chosen such as to obtain a specific desired overall color.

FIG. 2 shows the lamp 1 mounted in a bulb or envelope 11 having at one end thereof a standard lamp connection cap 12, suitable for screwing into a standard lamp fitting (not shown). The lamp 1 is axially aligned with the bulb 11. The lamp 1 is supported by two supportive conductors 13 and 14, suitably connected to the electrode conductors 8 and 9, respectively, and electrically connected to electrical contacts of the cap 12. The combination of lamp 1 and its surrounding bulb 11 will be indicated hereinafter as lamp assembly 10.

FIG. 2 illustrates the lamp assembly 10 in a horizontal orientation, i.e. the central axis of the discharge vessel 2 is positioned horizontally. In this orientation, a discharge arc between the electrodes 6 and 7 will have its arc axis directed horizontally. In this orientation, the spatial distribution of particles inside the discharge vessel 2, along the central axis thereof, will be substantially homogeneous, as illustrated by the horizontal line H in FIG. 3. FIG. 3 is a graph illustrating the partial particle pressure or particle concentration as a function of the location along the central axis of the discharge vessel 2. This location is represented by the horizontal axis of FIG. 3 where, by way of reference, the position of end caps 3 and 4 and electrodes 6 and 7 are indicated. The graph relates only to the space between the electrodes 6 and 7, i.e. the location of the arc.

Although in practice the composition of the mixture of the ionizable components may vary such that the partial pressure of each individual ionizable component may have a different value, this is not represented in FIG. 3. It is noted that, for the present discussion, the exact value of the partial component pressure is not relevant, therefore the vertical axis of FIG. 3 does not show any scale marks. Only at the level of the said horizontal line H, the value 100% is marked. This value corresponds to the "maximum" value a partial component pressure reaches along the lamp axis. Thus, since all partial component pressures are substantially constant (and therefore equal to the maximum value) along the lamp axis, all mutually different partial pressures are represented in FIG. 3 by only one horizontal line H.

It is important to realize that the light-emitting properties of the lamp 1 at a certain location in the lamp depend on the partial pressure of the ionizable components at that certain location. The higher the partial pressure of a specific component at said certain location, the more light will be produced having the specific spectral properties corresponding to this specific component. Thus, if the partial pressure of the components along the central axis of the lamp is constant, as illustrated by line H in FIG. 3, also the light-emissive properties of the lamp 1 as a whole are constant along the central axis of the lamp 1, i.e. constant light intensity and constant color.

FIG. 4 illustrates the problems of segregation associated with a vertical orientation of the lamp 1. FIG. 4 is comparable to FIG. 3, and by way of reference the horizontal line H corresponding to the horizontal orientation of the lamp 1 is shown as well. Otherwise, FIG. 4 relates to a vertical orientation of the lamp 1, where a burning arc will have its arc axis directed vertically. In the example shown, it is assumed that second electrode 7 is the lower electrode while first electrode 6 is the upper electrode, corresponding to the illustration of FIG. 1. Curves (A)-(E) show that in this condition the partial particle pressure is not constant but depends on the location. More particularly, the partial particle pressure decreases with increasing vertical distance from the bottom electrode 7. This phenomenon is a natural phenomenon, caused by a combination of convection and diffusion occurring within the discharge chamber 5, as will be clear to a person skilled in the art.

The effect of segregation may be more or less severe, depending on the circumstances. As a general rule, the effect is more severe as the pressure in the discharge chamber 5 increases. For instance, curve (A) might relate to a relatively low pressure situation in the order of 1-2 atm, while curve (E) might relate to a relatively high pressure situation in the order of 10-20 atm.

Furthermore, the effects of segregation tend to be most noticeable at one end of the lamp (the upper end in the example shown). Close to the lower electrode 7, the particle concentrations are virtually "normal" in this example, i.e. identical to the horizontal condition, illustrated by the fact that, at the location of lower electrode 7, all curves intersect each other at the horizontal line H. At other locations, the particle concentrations deviate from their value close to the lower electrode 7, the deviation increasing with increasing distance from the lower electrode 7, ending at a maximum deviation close to the upper electrode 6. As a general rule, the effect is more severe as the length Li of the discharge chamber 5 increases.

Furthermore, the severity of segregation is not equal for different elements within the same lamp. For instance, the segregation in the case of cerium iodide is more severe than the segregation in the case of sodium iodide, so that curve (B) might be representing cerium iodide while curve (A) might be representating sodium iodide. However, this does not necessarily mean that the partial pressure of sodium iodide is always higher than the partial pressure of cerium iodide.

Segregation affects the efficacy of the lamp 1, since the amount of light produced within a certain unit of space is proportional to the amount of light-generating particles within such unit of space, as will be clear to a person skilled in the art. Thus, segregation causes a reduction of light output of the lamp as a whole. Also, segregation causes an uneven distribution of the light intensity along the length of the lamp, more particularly, the higher portions of the lamp will produce less light than the lower portions of the lamp.

The above already applies if a lamp contains only one light-generating substance. In the case of a mixture of substances, the above applies also, but to a different extent for the various components in the mixture, as explained earlier. Since the overall color impression of the light produced by the lamp depends on the light contributions from the various components of the mixture, segregation causes a change of the color of the light produced by the lamp as a whole on the one hand, and on the other hand segregation causes an uneven color distribution along the length of the lamp.

This effect will be most noticeable at the upper extremity of the lamp 1, while the situation at the lower extremity of the lamp seems normal. As indicated in FIG. 4, at the lower electrode 7 the relative partial pressures of the light-producing components are substantially corresponding to the situation of horizontal orientation, and the generated light is in conformity with design expectations. In contrast, at the upper electrode 6, the relative partial pressures deviate from the situation of horizontal orientation, the extent of deviation being different for different components. For instance, in the case of a lamp containing a mixture of sodium iodide and cerium iodide in a predetermined ratio, the amount of reddish light (for instance: curve A) produced by the sodium iodide will, at the upper electrode 6, be reduced because of the reduced concentration of sodium atoms near the upper electrode 6 while also the amount of greenish light (for instance: curve B) produced by the cerium iodide will be reduced because of the reduced concentration of cerium atoms. Since, at the upper electrode 6, the intensity of reddish light as well as the intensity of greenish light will have been reduced, the overall light intensity around the upper electrode 6 will have been reduced. Since the reduction of greenish light is more than the reduction of reddish light, the overall impression of the color of the light produced around the upper electrode 6 will have shifted to reddish.

Curves (D) and (E) show that the segregation can be severe to such extent that a certain amount of space around the upper electrode 6 is virtually void of any light-producing ions. What remains is a background glow produced by the mercury buffer gas.

The present invention is based on the recognition that an electric field causes ion transport, and as a consequence also a transport of atoms of the same element in the opposite direction. This can be schematically illustrated as follows. Consider two electrodes 56 and 57 located vertically above each other, the upper electrode 56 being charged negatively with respect to the lower electrode 57, as schematically illustrated in FIG. 5. An electric field between these electrodes is indicated by arrows E. A positively charged particle P+ will be subject to a force pulling it towards the negatively charged upper electrode 56. In an equilibrium state, a cloud 58 of positively charged particles will have formed near the upper electrode 56, effectively shielding the negative charge of the upper electrode 56, thereby reducing the electric field E.

Thus, between these electrodes 56 and 57, an electric field induces a shift of the particle distribution, such that the concentration of positive particles close to the negative electrode is increased. As a result, an axial gradient of particles will be established.

The present invention uses this recognition to manipulate the light (amount and/or color temperature) produced by a metal-halide lamp by manipulating the particle distribution in the discharge chamber. Specifically, according to the present invention, during operation of the lamp 1, the lamp current applied to the lamp electrodes 6, 7 is given an average DC current component, selected such that, on average, a light-controlling electric field E with a desired direction and a desired strength is developed between the lamp electrodes 6, 7.

The following description relates to possible embodiments of driver devices implementing means for applying such a light-controlling voltage to the lamp electrodes 6, 7. Typical examples of preferred applications of the above inventive recognition will be discussed later.

As mentioned before, a metal-halide lamp is operated conventionally with commutating DC current. FIG. 6A is a block diagram schematically illustrating a driver device or electronic ballast 60 for driving a lamp 1. An electronic ballast or driver 60 typically comprises an input 61 for receiving an AC mains voltage, a rectifier 62 for rectifying the AC mains voltage to a rectified DC voltage, a DC/DC upconverter 63 for converting the rectified mains DC voltage to a higher DC voltage, a downconverter 64 for converting said higher DC voltage to a lower DC voltage (lamp voltage) and a corresponding DC current (lamp current), and a commutator 65 for regularly changing the direction of this DC current within a very brief time (commutating periods).

Conventionally, a driver 60 is designed such that its output may be considered as constituting a current source with alternating current direction but constant current magnitude, having a duty cycle of 50%, i.e. the periods of one current direction are equal to the periods of opposite current direction, such that each electrode is operated as a cathode during 50% of each current period and is operated as an anode during the other 50% of each current period. FIG. 6B is a graph showing the lamp current I as a function of time, illustrating this square wave current operation. It is clearly shown that the magnitude of the lamp current remains substantially constant ($I_{NOM}$), but the direction of the current is changed on a regular basis, indicated as a change of the sign of the current from positive to negative and vice versa In a full current period, the current flows from the first electrode 6 to the second electrode 7 during 50% of the time (positive current period), and in the opposite direction during the remaining 50% of the time (negative current period). Thus, the average current $I_{AV}$ is zero.

As mentioned above, according to the invention, the lamp current is given an average current value $I_{AV}$ differing from zero.

FIG. 6C illustrates one possibility of implementing the present invention. In this case, the average current $I_{AV}$ differs from zero because the current intensity during the positive current period differs from the current intensity during the negative current period. Again, the current has a duty cycle of 50%, i.e. the current flows in one direction during 50% of the time (+), and in the opposite direction during the remaining 50% of the time (−), but the current magnitude during the positive periods (+) is larger than the current magnitude during the negative periods (−). Thus, on average, an average current $I_{AV}$ flows from the first electrode 6 to the second electrode 7, indicated by the dashed line $I_{AV}$.

However, this type of implementation is not preferred, because the lamp current magnitude during the "positive" half of a current period differs from the current magnitude during the "negative" half of the current period, i.e. the current intensity is not constant. Since the light intensity is proportional to the current intensity, this might lead to undesirable flicker of the lamp.

FIG. 6D illustrates a preferred implementation of the present invention, in which this disadvantage is avoided, and which furthermore is easier to implement by means of an appropriate software or hardware adaptation in existing lamp drivers. In this case, the current intensity remains constant at all times, but the average current $I_{AV}$ differs from zero because the duty cycle differs from 50%. As FIG. 6D clearly shows, the "positive" current magnitude is always equal to the "negative" current magnitude, but the "positive" current period (+) lasts longer than the "negative" current period (−). Also in this case, on average, an average current $I_{AV}$ flows from the first electrode 6 to the second electrode 7, indicated by the dashed line $I_{AV}$.

In both cases, said average current $I_{AV}$ will induce a shift of the distribution of the positive ions towards the upper electrode 6, as described above.

Thus, according to this aspect of the present invention, the driver 60 is designed to have a duty cycle differing from 50%. According to a preferred aspect of the present invention, the driver 60 is designed to have an adaptable duty cycle. In a possible embodiment, the driver 60 may be provided with a control input 66 for receiving a duty-cycle control signal S, and may be responsive to a duty-cycle control signal S received at its control input 66 by setting a duty cycle.

In one aspect, the present invention is aimed at solving the problem of segregation affecting the properties of a lamp, intended for horizontal operation, when mounted in a vertical orientation, leading to a reduced efficacy, such as occurs typically in a low pressure lamp (1-2 atm). According to this aspect of the present invention, means are now provided which allow a reduction of segregation and hence an improvement of efficacy. It is even possible to provide a lamp system wherein the efficacy of the lamp can be controlled as desired, and can be set to a certain predetermined value, even in different lamp orientations. It is even possible to provide a lamp system wherein the efficacy is automatically kept constant, independent of lamp orientation.

It is noted here that a metal-halide lamp contains, during operation, a salt pool at a certain location inside the lamp. This salt pool is subjected to two flows of particles: inflow of particles entering the pool, and outflow of particles leaving the pool. In a steady state condition, the inflow and the outflow are balanced. If the lamp current is given an average current component $I_{AV}$ differing from zero, the inflow or the outflow is influenced, depending on the magnitude and direction of this average current component. In a steady state condition, a new balance between inflow and outflow will have established, associated with a new particle distribution within the lamp.

The direction of this average current component may deliberately be chosen such as to increase segregation; in that case, the average current component has shifted the balance such that more particles have entered the salt pool. However, in a specific implementation of the present invention, the direction of the average current component $I_{AV}$ is chosen such as to effectively eliminate or at least reduce the segregation effects discussed above. To this effect, the ion flow must be directed away from the salt pool in order to compensate segregation. In this case, the upper electrode 6 should, on average, be negative with respect to the lower electrode 7, and the average current $I_{AV}$ is directed upwards, as indicated in FIG. 1.

Furthermore, for one specific lamp specimen, there will be one specific optimum electric field corresponding to one specific optimum duty cycle. This optimum duty cycle will be substantially the same for different lamps of the same type, and this optimum value can be determined experimentally by the manufacturer. Thus, it is possible to provide a driving apparatus 60 with a mode selection switch 67 having three positions U, H, D, for operating a lamp 1 in a HORIZONTAL position (H) or in a vertical position (U, D) respectively corresponding to a specific electrode (for instance first electrode 6) being UP (U) or DOWN (D).

If the lamp 1 is mounted in a horizontal orientation, the user may set the mode selection switch 67 to its H-position. The driver 60 is responsive to this selection by generating a commutating current with a 50% duty cycle and constant current intensity.

If the lamp 1 is mounted in a vertical orientation, the user may set the mode selection switch 67 to either its U-position or its D-position, depending on which electrode is up and which is down. Usually, this will correspond to the lamp bulb 11 being mounted with the cap 12 downwards (lamp bulb "standing") or with the cap 12 upwards (lamp bulb "hanging"). The driver 60 is responsive to this selection by generating a commutating DC current with a constant current intensity and a predetermined optimum duty cycle.

If the lamp is symmetrical, the segregation in the case of a standing bulb is identical to the segregation in the case of a hanging bulb, and the light controlling electrical field for the correction in the up orientation can have the same strength but opposite direction in comparison to the light controlling electric field for the down orientation. If the lamp is not symmetrical, those two electrical strengths may differ from each other.

Let the duration of the periods during which a certain electrode (7; 6) is positive with respect to the other electrode (6; 7) be indicated as ($T_7$; $T_6$), respectively; then, the total current period $T_T = T_7 + T_6$. Now a duty cycle $D_U$ (corresponding to the case in which the mode selection switch 67 is in its U-position) can be defined as the ratio $T_7/T_T$, while a duty cycle $D_D$ (corresponding to the case in which the mode selection switch 67 is in its D-position) can be defined as the ratio $T_6/T_T$. In the case of a symmetrical lamp, $D_D = 1 - D_U$.

In the embodiment described above, the mode selection switch 67 is user-controllable. However, the present invention also provides, in a preferred embodiment, a system for generating light by means of a metal-halide lamp, wherein optimum operative conditions comparable to horizontal operation are set automatically, adapted to the actual lamp orientation. This means that the user is not limited by a certain prescribed lamp orientation, but also that the user does not need to select an optimum operative condition for the lamp driver: whichever the orientation the user desires to arrange the lamp in, the driver is automatically adapted to operate in an optimum mode.

Such a system 70 is illustrated in FIG. 7. This system 70 comprises a lamp driver or ballast 60 as described above with reference to FIGS. 6A-D, without, however, the user-controllable mode selection switch 67. The system 70 further comprises a holder 68 for receiving the lamp cap 12 of the lamp assembly 10, the holder 68 having contacts connected to output terminals of the commutator 65, as is known per se.

The system 70 further comprises a position detector 80 for detecting the actual orientation of the lamp 1, and for providing the control input 66 of the lamp driver 60 with a control signal S indicative of such orientation, whereas the lamp driver 60 is adapted to drive the lamp according to the optimum operative conditions corresponding to the actual lamp orientation as sensed by the orientation detector. In this respect, the responsiveness of the driver 60 is the same as described above, as will be clear to a person skilled in the art.

In principle, any detector suitable for generating a detectable signal indicative of an orientation can be used. FIG. 8 illustrates a possible embodiment of such an orientation detector. In this embodiment, the orientation detector 80 comprises a cylindrical container 81, for instance made from glass, with a central portion provided with a groove 82 having a larger diameter. The container 81 is sealed and contains a small amount of an electrically conductive liquid 83, for instance mercury. A first pair of contact electrodes 84 is arranged inside the container 81 near a first axial end thereof, connected to a first set of conductors 85 extending through the wall of the container 81. Similarly, a second pair of electrodes 86 is arranged at the opposite axial end, associated with a second set of conductors 87. A set of two annular electrodes 88 is arranged in the said groove, connected to a third set of conductors 89 extending through the wall of the container 81.

In FIG. 8, the detector 80 is shown in a horizontal orientation. The conductive liquid 83 has moved to the lowermost location inside the container 81, which in this case is the said groove 82, and contacts both central electrodes 88. Thus, an electrically conductive path is formed between the two corresponding conductors 89. Similarly, if the detector 80 is placed in an upright orientation, the conductive liquid 83 contacts the electrodes 84; 86 on either axial end of the cylinder.

Said conductors 85, 87, 89 are coupled to the control input 66 of the driver 60; thus, the driver 60 receives the detector output signals, and the driver 60 knows the orientation of the lamp 1 and drives the lamp accordingly.

The orientation detector 80 may be arranged within the bulb 11 of the lamp assembly 10. However, then it is necessary to provide for contacts in the lamp cap 12 for guiding the sensor signals towards the driver. Therefore, preferably, the sensor is associated with the said holder 68 for the lamp assembly 10, such a holder necessarily always having the same orientation as the lamp fitted therein. Then, a fixed connection between sensor and driver is possible.

As explained above, the average current $I_{AV}$ will induce an ion flow directed away from the salt pool. The higher the average current $I_{AV}$ magnitude, the stronger the ion flow. On the other hand, the salt pool is maintained by a reflow of atoms. Preferably, the average current $I_{AV}$ magnitude should not be selected too high, because then the salt pool is displaced to a different location and segregation is stimulated, wheter it be in another direction or not.

In another aspect, the invention aims to provide a lamp system with variable color properties. A driver preferred for such implementation is illustrated in FIG. 9. A system 90 comprises a lamp driver or ballast 60 as described above with reference to FIGS. 6A-D, without, however, the user-controllable mode selection switch 67, which is replaced by a control setting device 91, such as for instance a potentiometer, generating a control signal which can be varied continuously within a predetermined range. The control setting device 91 can be user-controllable, but it can also be a suitably programmed controller.

Again, the driver 60 produces a commutating DC current of constant current intensity, but now the duty cycle D can be varied, either directly by a user or by a suitably programmed controller, such as to change the amount of segregation as desired. In principle, the duty cycle D can be varied from 0 to 100%. Herein, the upper electrode 6 can be made negative with respect to the lower electrode 7 in order to reduce segregation to a desired extent, as described above, but the upper electrode 6 can also be made positive with respect to the lower electrode 7 in order to increase segregation and enhance the color separation effect or color changing effect.

In this respect it is noted that, in the case of a metal-halide lamp with a relatively high pressure in the order of 10-20 atm, changing the level of the average current $I_{AV}$ was surprisingly found to have a great influence on the color of the light produced.

With such a system, it has become possible to control a lamp such that a well-defined line is travelled in the standard XY-color or chromaticity diagram. The composition of the salt mixture enables a certain zero color point in this diagram to be selected. By varying the average current $I_{AV}$ of the commutating current (duty cycle), the color point of the lamp shifts along a line intersecting said zero color point. The angle of this line depends, inter alia, on the overall lamp pressure and the amount of mercury in the lamp: in the case of a low pressure lamp (i.e. overall lamp pressure lower than about 3 atm), said line will be substantially parallel to color isotherms, whereas in the case of a high pressure lamp (i.e. overall lamp pressure higher than about 10 atm), said line will be substantially perpendicular to color isotherms, which involves a large variation in color temperature.

This aspect of the invention can be practiced in a vertical lamp orientation as well as in a horizontal lamp orientation. As explained above, segregation will occur if a metal-halide lamp is mounted vertically, and this segregation can be reduced or increased by applying a DC current component. The important feature in this respect is that it is possible to change the particle distribution instantaneously by applying a DC current component. This feature is not restricted to vertical lamp orientation.

In a horizontal lamp orientation, a salt pool will have formed at a certain location, which, in the case of a symmetrical, long, thin lamp, typically is at one end or both ends of the lamp. As explained earlier, there is a balance between inflow and outflow of particles into and out of the salt pool, corresponding to a certain particle distribution inside the lamp. According to the invention, it is possible to shift this particle distribution by applying a DC current component. This phenomenon will also be termed "current induced distribution shift".

In order to obtain a defined initial situation, it is possible to operate the lamp at DC current (e.g. duty cycle 0%). Then, after some time, the salt pool will be located at one of the two ends of the lamp; segregation is now at a maximum.

From this starting situation, the segregation can be reduced by raising the duty cycle from 0%. With increasing duty cycle, a new balance will establish between inflow and outflow, the salt pool initially staying substantially in place. The segregation can be eliminated by raising the duty cycle to 50%. A duty cycle of more than 50% leads to an undesired transportation of salt.

The duty cycle range between 0% and 50% determines the color range of the lamp, attainable by this aspect of the present invention. When the duty cycle is 0%, the light produced by the lamp can be represented by a certain color point in the chromaticity diagram. The exact location of this color point, which will also be termed "horizontal zero" color point, depends on the composition of the mixture of elements within the lamp, and can be selected by suitably selecting this composition, as will be clear to a person skilled in the art. If the duty cycle is increased, the color point will shift away from the horizontal zero color point. An end point is reached when the duty cycle reaches 50%. Thus, the color point will travel a line, hereinafter termed "color line", which has one end point defined by the horizontal zero color point and an opposite end point defined by a 50% duty cycle. This involves a change of the color temperature in the order of between 1500 K and 2000 K.

If the initial situation is reversed, i.e. by initially setting the duty cycle to 100%, changing the duty cycle from 100% to 50% will yield substantially the same results.

Thus, for a high-pressure lamp (10-20 atm), it has proved possible to vary the color temperature over a range in the order of 1500-2000 K.

In the case of a lamp with an asymmetric geometry, the salt pool will have a preferred location, i.e. the coldest place in the lamp, which is typically one end of the lamp. If we assume that this preferred location corresponds to the initial position obtained by setting a duty cycle of 0%, then it is possible to increase the duty cycle to above 50%, to a limited extent, before transportation of salt occurs. Hence, the color temperature variation range will be larger.

This range is even wider (2500-3000K) in the case of vertical lamp orientation, due to the fact that in such a case the salt pool will typically be located at one end of the lamp, i.e. the coldest spot of the lamp, typically the lower end. In this case, when the same lamp as discussed above is turned from a horizontal orientation to a vertical orientation, while the average DC current is zero, segregation may occur and the color temperature may shift. This shift will depend on the composition of the mixture of elements within the lamp, and on the amount of segregation. Again, the light produced by the lamp can be represented by a color point in the chromaticity diagram, which will now be termed "vertical zero" color point.

If an average DC current is now added, depending on the direction of the average DC current, the segregation will be increased or decreased, while in both cases the color point will shift.

In the case of a vertically burning lamp, the discharge is asymmetric due to convection. Typically, the temperature at the upper end of the lamp is higher than the temperature at the lower end of the lamp. Therefore, the partial pressures of the salt components can be higher than the partial pressures just above the salt pool before condensation occurs. Due to this, and to the fact that this effect does not occur to an equal extent for all salt components, the range from no segregation to maximum segregation can correspond to an additional variation in color temperature, and the maximum color temperature variation can be larger than in the case when the lamp is mounted horizontally.

Thus, for a high-pressure lamp (10-20 atm) mounted vertically, it has been found possible to obtain a color temperature variation of about 2500 to 3000 K.

With such a system, it has also appeared possible to provide a multi-color lamp. To explain this, reference is once again made to FIG. 4. As explained earlier, the severity of segregation can be different for different substances, and the same applies for the enhanced segregation as caused by a light controlling average current $I_{AV}$ in accordance with the invention. Let us assume that curves (A) and (B) represent sodium iodide and cerium iodide, respectively, for a lamp operated with an average current $I_{AV}$ being zero. Let us further assume that curves (C) and (D) represent sodium iodide and cerium iodide, respectively, for the same lamp that is now operated with an average current $I_{AV}$ having a direction selected such as to enhance the segregation. Then, the lamp will show three bands of light. In the lowest region I of the lamp, the color of the light will be close to "normal" white light, although shifted to reddish. In a second region II of the lamp, above the first region, cerium iodide is almost completely absent, and the emitted light does not have any green contribution from cerium iodide any more: the color of the light is now completely determined by sodium iodide, i.e. red. In a third region III of the lamp, above the second region, also the sodium iodide is almost completely absent, and the emitted light does not have any red contribution from sodium iodide any more; if the lamp does not contain any other salts, this third region will emit a blue-ish glow from the mercury buffer gas. If the lamp does have a third salt component with less segregation, the light generated by this third component will dominate.

Thus, a very colorful effect of multiple bands with different colors is possible.

When varying the magnitude of the average current $I_{AV}$, the ion flow direction may be directed away from the salt pool to decrease segregation or may be directed towards the salt pool to increase segregation. In the first case, the magnitude of the average current $I_{AV}$ should preferably be selected below a threshold level where the salt pool as a whole is displaced, as mentioned earlier. In the second case, the magnitude of the average current $I_{AV}$ does not suffer from such restrictions.

In summary, the present invention thus succeeds in providing a method for driving a metal halide lamp 1, the method comprising the step of generating a light controlling DC electric field E with a desired direction and a desired strength inside the lamp to obtain a desirable ion distribution inside the lamp. The lamp is supplied with a commutating current with a DC component, preferably having a constant current intensity and a duty cycle differing from 50%. By setting the duty cycle, it is possible to set a certain average value of the lamp current, allowing the efficacy and/or color temperature of the lamp to be influenced.

Although the present invention has been explained in the foregoing by means of descriptions of some exemplary embodiments, it should be clear to a person skilled in the art that the present invention is not limited to such embodiments; rather, various variations and modifications are possible within the protective scope of the invention as defined in the appending claims.

For instance, in the above it has been explained that a desirable particle distribution inside the lamp can be established by causing a suitable light controlling electric field E having a suitable direction and a suitable strength, while further it has been explained that utilizing a lamp current with a suitable average current intensity $I_{AV}$ is a preferred way of manipulating the particle distribution. However, within the scope of the present invention, other ways of causing a suitable light-controlling electric field E are feasible too, such as for instance the use of an external electromagnet.

Furthermore, the description above relates primarily to steady state operation. During a start phase of the lamp, the average current intensity $I_{AV}$ is preferably zero.

The invention claimed is:

1. A driving apparatus for driving a gas discharge lamp, the apparatus comprising:
   current generating means for generating a current with a substantially constant current intensity;
   commutating means for receiving said current, and having an output for connecting to the lamp, the commutating means being arranged for commutating said current with a duty cycle differing from 50%; and a mode selection switch having at least three positions;

the commutating means being arranged for generating a commutating current with a 50% duty cycle and the constant current intensity when said mode selection switch is placed in a first position indicative of a horizontal orientation of the lamp, and for generating a commutating DC current with the constant current intensity and a predetermined duty cycle differing from 50% when said mode selection switch is placed in a second position or in a third position indicative of a vertical orientation of the lamp.

2. The driving apparatus according to claim 1, wherein the commutating means are arranged for commutating said current with a variable duty cycle.

3. The driving apparatus according to claim 2, further comprising a control input for receiving a control signal, wherein the driving apparatus is responsive to the control signal received at the control input to set the duty cycle accordingly.

4. The driving apparatus according to claim 3, wherein the mode selection switch is coupled to said control input.

5. The driving apparatus according to claim 3, adapted for a variable current-controlled particle distribution shift, wherein the driving apparatus is provided with a control setting device coupled to said control input;

wherein the control setting device is arranged for generating the control signal which is continuously variable within a predetermined range;

and wherein the driving apparatus is arranged to continuously vary the duty cycle of the commutating lamp current in response to said control signal.

6. The driving apparatus according to claim 1, wherein said predetermined duty cycle has a predetermined first value ($D_D$) differing from 50% when said mode selection switch is placed in said second position indicative of a standing orientation of the lamp, and wherein said predetermined duty cycle has a predetermined second value ($D_U$) differing from 50% when said mode selection switch is placed in said third position indicative of a hanging orientation of the lamp; and wherein $D_D \neq D_U$.

7. The driving apparatus according to claim 6, designed for driving a symmetrical lamp, wherein $D_D = 100\% - D_U$.

8. The driving apparatus according to claim 1, adapted to generate said current with a duty cycle equal to 50% during a start phase of the lamp.

9. A variable color temperature light generating system, further comprising:

a driving apparatus according to claim 1, the driving apparatus being capable of driving the gas discharge lamp with a variably settable average current intensity in order to induce a variable current-controlled particle distribution shift in the gas discharge lamp, so as to allow a color point to travel a color line in the chromaticity diagram over a relatively large color temperature range of more than 1500 K.

10. The driving apparatus of claim 1, wherein the gas discharge lamp is a high intensity discharge lamp.

11. The driving apparatus of claim 1, wherein the gas discharge lamp is a metal halide lamp with an aspect ratio of length/diameter larger than 3 or 4.

* * * * *